(12) United States Patent
Koyama et al.

(10) Patent No.: US 9,441,543 B2
(45) Date of Patent: Sep. 13, 2016

(54) GAS TURBINE COMBUSTOR INCLUDING A PREMIXING CHAMBER HAVING AN INNER DIAMETER ENLARGING PORTION

(71) Applicants: Masamichi Koyama, Niigata (JP); Shigeru Tachibana, Tokyo (JP)

(72) Inventors: Masamichi Koyama, Niigata (JP); Shigeru Tachibana, Tokyo (JP)

(73) Assignees: NIIGATA POWER SYSTEMS CO., LTD., Tokyo (JP); Shigeru Tachibana, Tokyo (JP)

( * ) Notice: Subject to any disclaimer, the term of this patent is extended or adjusted under 35 U.S.C. 154(b) by 818 days.

(21) Appl. No.: 13/682,210

(22) Filed: Nov. 20, 2012

(65) Prior Publication Data

US 2014/0137557 A1      May 22, 2014

(51) Int. Cl.
| | |
|---|---|
| *F23R 3/28* | (2006.01) |
| *F02C 7/22* | (2006.01) |
| *F02C 3/14* | (2006.01) |
| *F23R 3/12* | (2006.01) |
| *F23R 3/18* | (2006.01) |
| *F23R 3/32* | (2006.01) |

(52) U.S. Cl.
CPC . *F02C 7/22* (2013.01); *F02C 3/14* (2013.01); *F23R 3/12* (2013.01); *F23R 3/18* (2013.01); *F23R 3/286* (2013.01); *F23R 3/32* (2013.01)

(58) Field of Classification Search
CPC ............ F23R 3/286; F23R 3/32; F23R 3/12; F23D 11/402; F23C 7/002
USPC .................................................. 60/737, 748
See application file for complete search history.

(56) References Cited

U.S. PATENT DOCUMENTS

| 3,703,259 | A | * | 11/1972 | Sturgess | ................. | F23D 11/10 239/400 |
| 4,343,148 | A | * | 8/1982 | Shekleton | ............... | F23D 11/06 60/744 |
| 4,475,885 | A | * | 10/1984 | Finke | ...................... | F23C 7/002 239/424 |
| 5,423,674 | A | * | 6/1995 | Knopfel | ................. | F23C 7/002 431/115 |
| 5,540,056 | A | * | 7/1996 | Heberling | ............... | F23D 11/36 60/737 |

(Continued)

FOREIGN PATENT DOCUMENTS

| EP | 0833105 A2 | 4/1998 |
| JP | 2005-055091 A | 3/2005 |

(Continued)

OTHER PUBLICATIONS

Europe Patent Office, "Search Report for EP 12194055.5," May 8, 2013.

(Continued)

*Primary Examiner* — William H Rodriguez
(74) *Attorney, Agent, or Firm* — Manabu Kanesaka

(57) ABSTRACT

A gas turbine combustor includes a combustion cylinder and a premixing tube. A protruding wall of the tube has an inner diameter enlarging portion with a chamfer at an open end thereof. A swirl flow in the tube is guided outward along the chamfer, so that the cross-section area of a straight flow in the tube is expanded to have a lower flow velocity, and the distance between a flame in the cylinder and the enlarging portion is shortened. When using the fuel with high heat radiation upon combustion, the enlarging portion is replaced with the one having a smaller chamfer. The cross-section area of the straight flow is reduced to increase the flow velocity, and the lift distance becomes longer. Therefore, the damage to the combustion cylinder owing to the intensified heat radiation is prevented. The flame lift position retained in the cylinder is easily set and changed.

9 Claims, 7 Drawing Sheets

(56) References Cited

U.S. PATENT DOCUMENTS

| | | | |
|---|---|---|---|
| 5,592,819 A | 1/1997 | Ansart et al. | |
| 5,623,827 A * | 4/1997 | Monty | F23R 3/10 60/747 |
| 5,664,412 A * | 9/1997 | Overton | F23R 3/26 60/39.23 |
| 5,664,943 A * | 9/1997 | Joos | F23C 7/002 431/284 |
| 5,687,571 A * | 11/1997 | Althaus | F23C 5/00 60/737 |
| 5,735,681 A | 4/1998 | Cheng | |
| 5,879,148 A | 3/1999 | Cheng et al. | |
| 5,944,511 A * | 8/1999 | Ruck | F23C 7/002 431/183 |
| 6,126,439 A | 10/2000 | Knopfel et al. | |
| 6,331,109 B1 * | 12/2001 | Paikert | F23C 7/002 431/350 |
| 6,461,151 B1 * | 10/2002 | Knoepfel | F23C 7/002 431/174 |
| 6,546,732 B1 * | 4/2003 | Young | F23D 14/78 60/740 |
| 6,572,366 B2 | 6/2003 | Eroglu et al. | |
| 6,672,862 B2 * | 1/2004 | Neville | F23C 9/006 431/116 |
| 7,175,423 B1 * | 2/2007 | Pisano | F23C 6/045 431/10 |
| 7,434,401 B2 | 10/2008 | Hayashi | |
| 8,656,721 B2 * | 2/2014 | Matsumoto | F23R 3/34 60/733 |
| 8,943,834 B2 * | 2/2015 | Koyama | F23R 3/12 60/737 |
| 2004/0035386 A1 * | 2/2004 | Sanders | F23D 11/101 123/305 |
| 2004/0255589 A1 * | 12/2004 | Yoshida | F23R 3/286 60/746 |
| 2005/0247065 A1 * | 11/2005 | Dudebout | F23R 3/286 60/776 |
| 2006/0174625 A1 * | 8/2006 | Ohri | F23R 3/14 60/737 |
| 2007/0269757 A1 * | 11/2007 | Commaret | F23R 3/10 431/265 |
| 2007/0271927 A1 * | 11/2007 | Myers | F02C 9/28 60/776 |
| 2009/0100837 A1 * | 4/2009 | Von Der Bank | F23R 3/32 60/737 |
| 2009/0151357 A1 * | 6/2009 | Pieussergues | F23R 3/14 60/737 |
| 2010/0146983 A1 * | 6/2010 | Hellat | F23R 3/343 60/772 |
| 2010/0175382 A1 * | 7/2010 | Eroglu | F23C 6/047 60/748 |
| 2010/0300104 A1 * | 12/2010 | Bottcher | F23R 3/283 60/740 |
| 2010/0308135 A1 * | 12/2010 | Yamamoto | F23R 3/343 239/402 |
| 2011/0000216 A1 * | 1/2011 | Imamura | F23R 3/14 60/748 |
| 2011/0265482 A1 | 11/2011 | Parsania et al. | |
| 2011/0271682 A1 * | 11/2011 | Sandelis | F23C 7/004 60/737 |
| 2011/0296840 A1 * | 12/2011 | Turrini | F23R 3/286 60/747 |
| 2012/0305673 A1 * | 12/2012 | Matsuyama | F23R 3/343 239/533.2 |
| 2014/0137556 A1 * | 5/2014 | Koyama | F23R 3/12 60/737 |
| 2015/0377489 A1 * | 12/2015 | Sandelis | F02C 7/22 60/737 |

FOREIGN PATENT DOCUMENTS

| | | |
|---|---|---|
| JP | 2005-283002 A | 10/2005 |
| JP | 2009-198054 | 9/2009 |

OTHER PUBLICATIONS

Japan Patent Office, "Office Action for JP 2011-117087," Aug. 26, 2014.

* cited by examiner

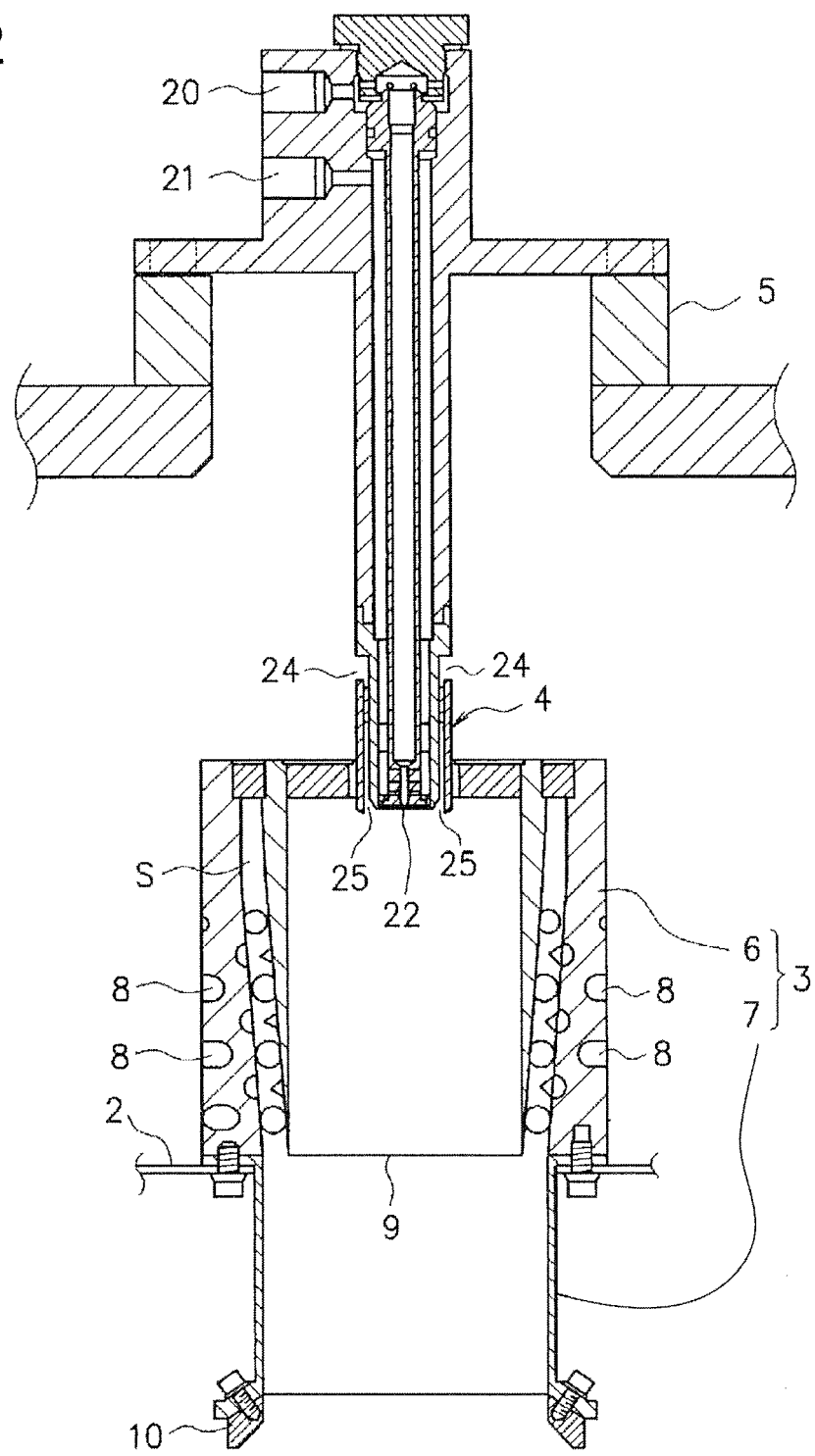

Fig.3A
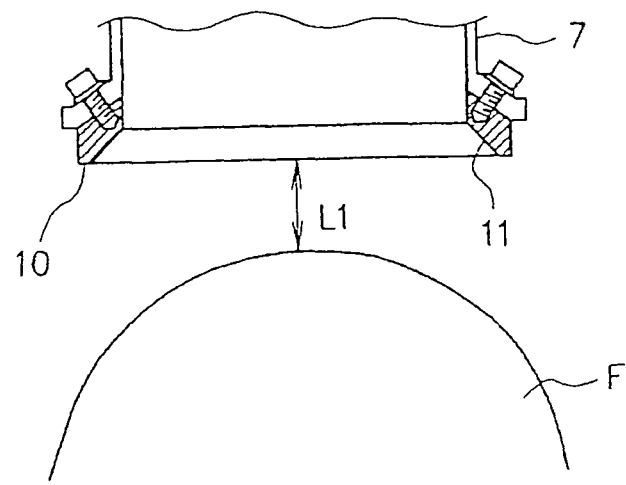
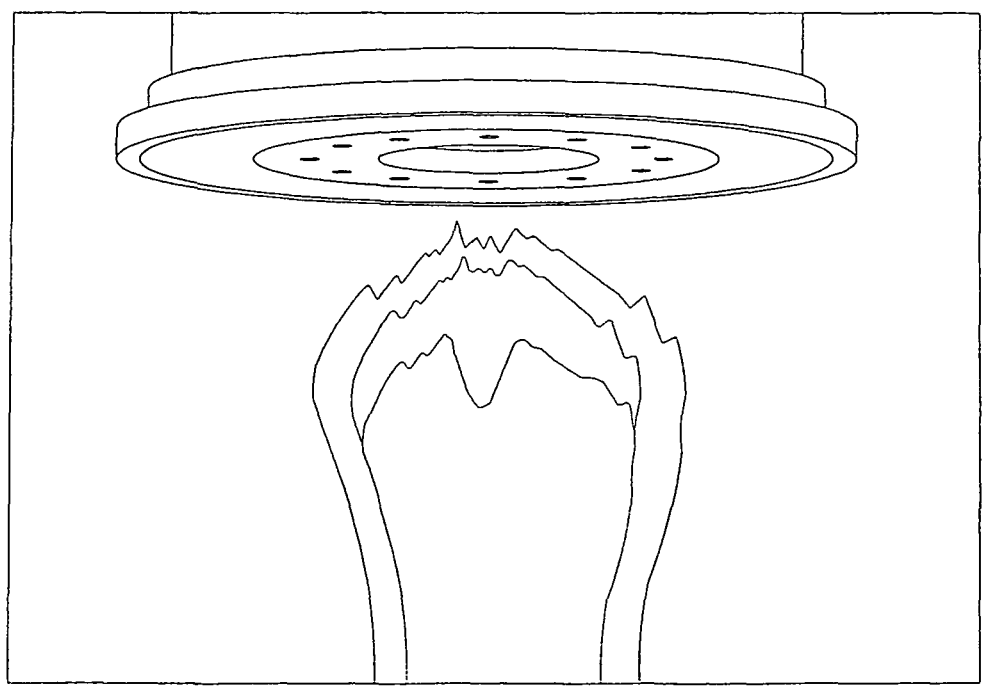
Fig.3B

Fig.4A
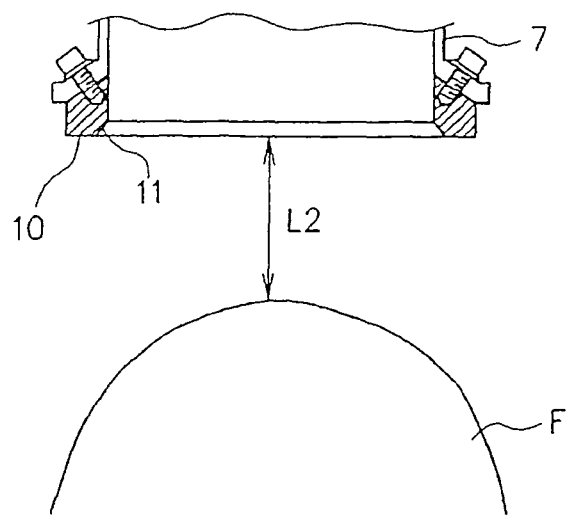
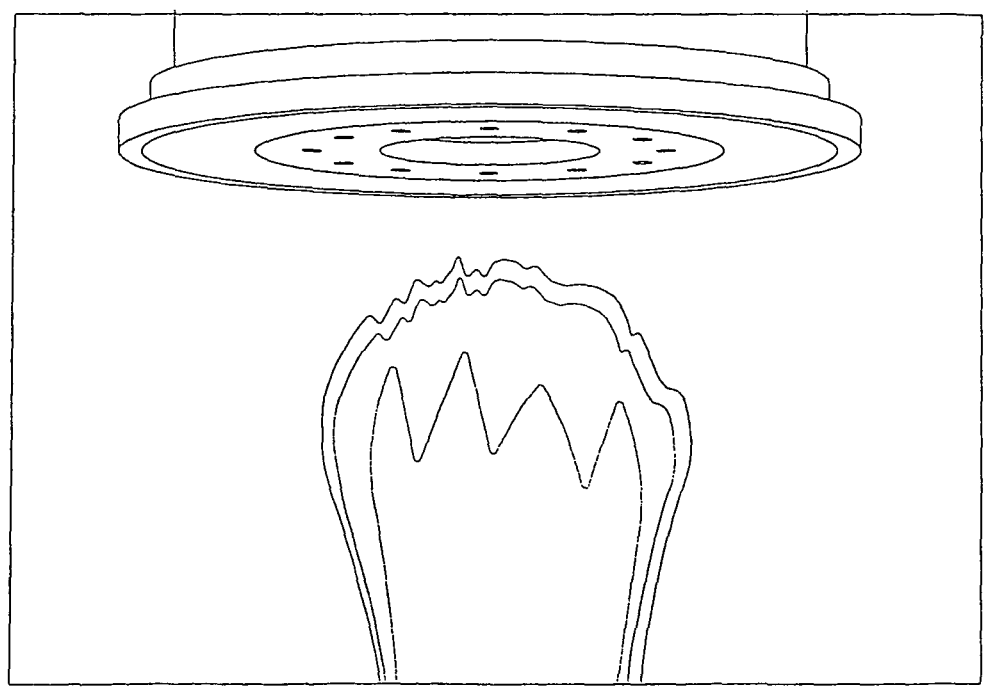
Fig.4B

GAS TURBINE COMBUSTOR INCLUDING A PREMIXING CHAMBER HAVING AN INNER DIAMETER ENLARGING PORTION

TECHNICAL FIELD

The present invention relates to a gas turbine combustor. More particularly, the present invention relates to a structure of the gas turbine combustor, which adds a special structure to an open part communicated with a premixing tube and a combustion cylinder to allow a position of a flame retained within the combustion cylinder to be easily set and changed in accordance with intensity of radiation heat of the fuel in use so as to prevent deterioration in durability of the combustion cylinder by the heat of the flame.

BACKGROUND ART

Japanese Unexamined Patent Application Publication No. 2009-198054 discloses a gas turbine combustor 1 provided with a combustion cylinder 2, a premixing tube 3, and a fuel supply unit 5. The gas turbine combustor 1 is configured to allow the fuel supply unit to supply the fuel to an annular fuel passage 16 along a tangential direction so that the fuel is uniformly injected through an annular nozzle portion 19. The injected fuel is atomized by air from a circumferential air passage 22 that surrounds the nozzle portion, and an axial flow is generated in the combustor. Meanwhile, air flowing inside through holes 25 in a peripheral wall surface of the premixing tube generates a swirl flow that surrounds the axial flow within the combustor. As a result, the flame is retained at a position apart from a top portion of the combustion cylinder so that a heat shield plate 6 is not excessively heated, resulting in improved durability.

U.S. Pat. Nos. 5,735,681 and 5,879,148 disclose the gas turbine combustor configured to sufficiently mix the fuel and air by air of straight flow directed to the combustion cylinder and air of the swirl flow generated by a swirler for the burner that combusts the fuel so as to stabilize the combustion and realize low emission.

The generally employed gas turbine combustor as described above is normally configured to retain the flame generated by combusting the mixture supplied from the premixing tube in the combustion cylinder at the position apart from the top portion thereof in communication with the premixing tube by a predetermined distance so as to prevent the radiation heat of the flame from damaging the combustion cylinder. The distance from the top portion of the combustion cylinder to the flame is called a lift distance.

The radiation heat of the flame varies with type of the fuel in use. Accordingly, the generally employed gas turbine combustor has been designed to balance the swirl air quantity from the premixing tube with the straight air quantity in accordance with the type of the fuel in use so that the flame lift distance has an appropriate length to prevent thermal damage to the device.

Specifically, the number of swirls of the swirler in use, and the shape and structure of the premixing tube are adjusted to set the balance between the swirl air quantity and the straight air quantity to a desired value. Such adjustment of the structure of the respective portions in accordance with the desired lift distance is very complicated and troublesome work, and considerably time-consuming and costly.

Even if the gas turbine combustor is configured to set the lift distance in accordance with the fuel of the predetermined type, there may be the case where the fuel that generates different radiation heat upon combustion has to be used for certain reasons of usage. In such a case, structures of the respective parts of the gas turbine combustor have to be changed to adjust the swirl air quantity from the premixing tube and the straight air quantity for the purpose of setting a different lift distance in response to the change of the fuel type. Specifically, if the lift distance is intended to be shortened, the modification by increasing the swirl air quantity and reducing the straight air quantity will be necessary. Meanwhile, if the lift distance is intended to be extended, the modification by reducing the swirl air quantity and increasing the straight air quantity will be necessary. The aforementioned modifications are far more complicated and troublesome than providing a newly manufactured gas turbine combustor, even more time-consuming and costly.

SUMMARY OF THE INVENTION

It is an object of the present invention to allow the flame lift position retained within the combustion cylinder to be easily set and changed so as to be adaptable to the variable radiation heat of the fuel in use.

A first aspect of the present invention provides a gas turbine combustor which includes a combustion cylinder that combusts a mixture of fuel and air for supply of a combustion gas to a turbine, a premixing tube which is open to the combustion cylinder, and mixes the supplied fuel and air so as to be supplied to the combustion cylinder, an inner diameter enlarging portion provided at an open end of the premixing tube, which is open to the combustion cylinder, and a fuel supply unit attached to the premixing tube for supplying the fuel to the premixing tube.

A second aspect of the present invention is the gas turbine combustor according to the first aspect wherein the inner diameter enlarging portion includes a planer processed portion at a predetermined angle.

A third aspect of the present invention is the gas turbine combustor according to the first aspect wherein the inner diameter enlarging portion includes a curved portion.

The gas turbine combustor according to the present invention is provided with an inner diameter enlarging portion at an open end of the premixing tube that faces the combustion cylinder. The flame lift distance within the combustion cylinder is determined in accordance with the shape of the inner diameter enlarging portion. That is, the inner diameter enlarging portion is configured to enlarge the inner diameter along the axial direction from the premixing tube to the combustion cylinder. Therefore, the swirl flow of air flowing along the inner circumferential surface of the premixing tube moves along the inner diameter enlarging portion at the opening of the premixing tube, and flows into the combustion cylinder while spreading outward.

The enlargement of the inner diameter by the inner diameter enlarging portion becomes relatively large so that the spread to the outside is larger, the swirl flow of air is guided to the outside to higher degree in the combustion cylinder. Then the cross-section area of the air straight flow that moves along the center of the premixing tube becomes relatively large. Assuming that each quantity of the fuel and air is kept constant, the flow velocity of the mixture becomes relatively low, and the flame is retained at the position closer to the premixing tube, resulting in the lift distance becoming relatively short.

On the contrary, as the enlargement of the inner diameter by the inner diameter enlarging portion becomes relatively small so that the spread to the outside is relatively small, the air swirl flow in the combustion cylinder is guided to the outside to relatively low degree in the combustion cylinder.

The resultant cross-section area of the straight flow of air that moves along the center of the premixing tube becomes relatively small. Assuming that each quantity of the fuel and air is kept constant, the flow velocity of the mixture becomes relatively high, and the flame is retained at the position farther away from the premixing tube, resulting in the lift distance becoming relatively long.

When using the fuel that generates relatively high heat radiation upon combustion, the inner diameter enlarging portion that makes relatively small enlargement of the inner diameter may be employed to make the lift distance of the flame relatively long. When using the fuel that generates relatively low heat radiation upon combustion, the inner diameter enlarging portion that makes relatively large enlargement of the inner diameter may be employed to make the lift distance of the flame relatively short. The flame lift distance may be arbitrarily set in accordance with the heat radiation of the fuel to be used only by replacing the inner diameter enlarging portion without making an extensive change in the structure to change the swirl air quantity and the straight air quantity. This ensures to prevent deterioration in durability of the combustion cylinder caused by heat of the flame irrespective of the fuel type.

BRIEF DESCRIPTION OF THE DRAWINGS

FIG. 2 is an enlarged longitudinal sectional view of a part around a premixing tube according to the embodiment;

FIG. 3A is an enlarged longitudinal sectional view schematically showing a structure around an opening of the premixing tube according to the embodiment (type C8 chamfer of the inner diameter enlarging portion) and a lift distance L1 of the flame, which is relatively short upon combustion;

FIG. 3B is a photograph of the flame indicated in FIG. 3A;

FIG. 4A is an enlarged longitudinal sectional view schematically showing a structure around the opening of the premixing tube according to the embodiment (type C3 chamfer of the inner diameter enlarging portion) and a lift distance L2 of the flame, which is relatively set as a median value upon combustion;

FIG. 4B is a photograph of the flame indicated in FIG. 4A;

DESCRIPTION OF EMBODIMENTS

Figure 1:
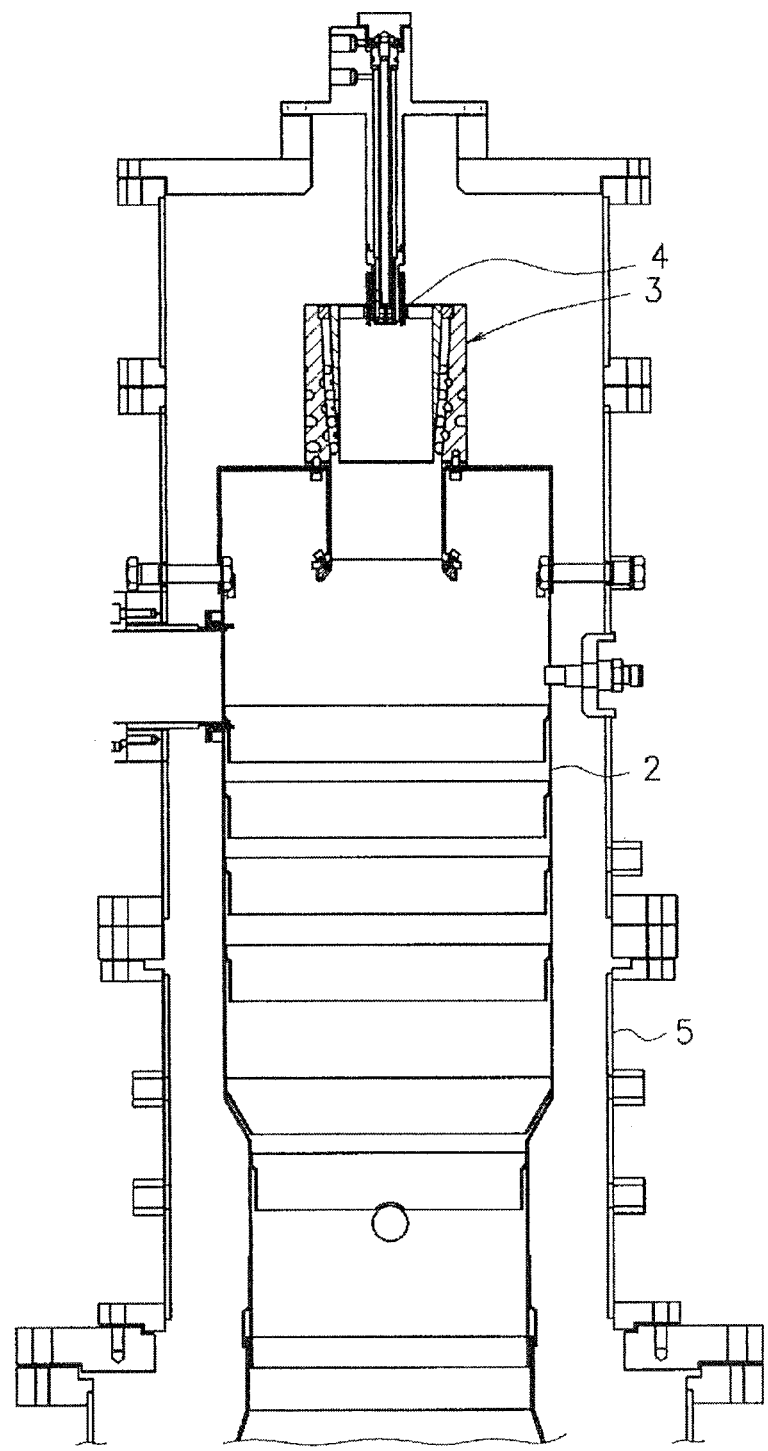
FIG. 1 is a longitudinal sectional view of a gas turbine combustor according to an embodiment of the present invention.

Embodiments of the present invention will be described in detail referring to the drawings.

Referring to FIG. 1, a general structure of a gas turbine combustor 1 according to a first embodiment will be described.

The gas turbine combustor 1 includes a substantially cylindrical combustion cylinder 2. The combustion cylinder 2 has a top portion closed, and a lower opening communicated with an exhaust side of a not shown gas turbine. The top portion of the combustion cylinder 2 is provided with a premixing tube 3, which will be described in detail later. A top portion of the premixing tube 3 is provided with a pressure injection unit 4 as a fuel supply unit. The combustion cylinder 2 and the premixing tube 3 are encased with an outer cylinder 5 communicated with a compressed air inlet of a not shown turbo-compressor. A part of a fuel supply system connected to the pressure injection unit 4 is guided to the outside while penetrating the top portion of the outer cylinder 5.

Referring to FIGS. 1 and 2, at the center position of the top portion of the combustion cylinder 2, the premixing tube 3 is coaxially provided. The premixing tube 3 includes a cylindrical peripheral wall 6 provided outside the top portion of the combustion cylinder 2, and a cylindrical protruding wall 7 that is provided at the top portion of the combustion cylinder 2 so as to partially protrude downward by a predetermined dimension into the combustion cylinder 2. The peripheral wall 6 has a straight cylindrical outer shape, and an inner shape with the inner diameter gradually reduced toward the combustion cylinder 2 in the downward direction. The peripheral wall 6 has a plurality of holes 8 along the tangential direction, which allow air to flow inside. The protruding wall 7 connected to the lower end of the peripheral wall 6 has the straight cylindrical shape with the same inner diameter as that of the opening of the peripheral wall 6 at the lower end.

Referring to FIGS. 2, 3A and 3B, an inner diameter enlarging portion 10 is attached to an open end of the protruding wall 7 of the premixing tube 3, which is open within the combustion cylinder 2. The inner diameter enlarging portion 10 is an annular member, and has a chamfer 11 as a planar worked portion directed diagonally downward at a predetermined angle formed on an inner circumferential edge. In this embodiment, the chamfer with dimensions in horizontal and vertical directions of 8 mm is applied at the angle of 45°, that is, the chamfer corresponding to type C8 specified as JIS code is applied to the inner circumferential edge.

Referring to FIG. 2, a cylindrical inner wall 9 is provided inside the peripheral wall 6 of the premixing tube 3 coaxially at a predetermined interval therebetween. An outer circumferential surface of the inner wall 9 has an outer diameter gradually reduced toward the combustion cylinder 2 in the downward direction. The radial distance between the peripheral wall 6 and the inner wall 9 is kept constant, which defines a cylindrical gap S penetrating downward. The gap S has its upper end at one end side of the premixing tube 3 closed, and a lower end opened around the upper end of the protruding wall 7. The inner circumferential surface of the inner wall 9 has a straight cylindrical shape. The upper end of the inner wall 9 at one end side of the premixing tube 3 is opened to the outer cylinder 5.

The compressed air from the turbo-compressor, which is guided into the outer cylinder 5 flows inside through the holes 8 formed in the peripheral wall 6 of the premixing tube 3, and then forms a swirl flow in the cylindrical gap S between the peripheral wall 6 and the inner wall 9. It moves to the open end while swirling along the inner circumferential surface of the protruding wall 7 so as to be fed into the combustion cylinder 2 via the inner diameter enlarging portion 10.

The compressed air is supplied to the inside of the inner wall 9 from the opening at the upper end thereof together with the fuel supplied from the pressure injection unit 4, which are formed into the mixture. The mixture forms the homogeneous straight flow along the axial direction of the inner wall 9 over the whole region inside thereof under no influence of the interference of the swirl flow. It is then supplied into the combustion cylinder 2.

The chamfer 11 of the inner diameter enlarging portion 10 is diagonally directed downward, and is shaped to have the inner diameter increased toward the combustion cylinder 2 along the center axis. The air swirl flow out of the gap S flows along the chamfer 11 of the inner diameter enlarging portion 10 at the open end of the protruding wall 7 of the premixing tube 3 so as to flow into the combustion cylinder 2 while spreading outward.

The effect of guiding the air swirl flow outward in the combustion cylinder 2 is generated in accordance with the enlargement of the inner diameter by the inner diameter enlarging portion 10. Therefore, the cross-section area of the air straight flow that moves along the center of the premixing tube 3 is influenced as described below depending on the degree of guiding the swirl flow outward.

As the degree of guiding the air swirl flow to the outside by the inner diameter enlarging portion 10 is increased, the cross-section area of the air straight flow becomes large. Assuming that each quantity of the fuel and air is kept constant, the flow velocity of the mixture becomes relatively low. The lift distance is then reduced so that the flame is brought into closer to the top portion of the combustion cylinder 2. As the degree of guiding the air swirl flow to the outside by the inner diameter enlarging portion 10 is reduced, the cross-section area of the air straight flow becomes small. Assuming that each quantity of the fuel and air is kept constant, the flow velocity of the mixture becomes relatively high. The lift distance is increased so that the flame is farther apart from the top portion of the combustion cylinder 2. In this way, the lift distance of the flame is determined in accordance with enlargement of the inner diameter by the chamfer 11 of the inner diameter enlarging portion 10 (in this case, size of the chamfer).

As shown in FIG. 2, the pressure injection unit 4 is provided at the center of the opening at the upper end of the peripheral wall 6 at one end side of the premixing tube 3. The pressure injection unit is a pressure injection nozzle of hollow cone type, which atomizes liquid fuel in a highly advanced manner by injecting the fuel in a hollow conical shape. The pressure injection unit 4 is configured to discharge the fuel supplied from two fuel supply channels, a main supply channel 20 and a pilot supply channel 21, through a single injection nozzle 22. The swirl motion is applied to the fuel so that the fuel discharged through the injection nozzle 22 spreads under centrifugal force to form a hollow cone film. As the pressure injection nozzle of hollow cone type, the simplex injection valve is known.

An injection angle of the injection nozzle 22 of the pressure injection unit 4 is set so that the conically injected fuel is not adhered to the inner diameter enlarging portion 10 attached to the open end of the protruding wall 7 of the premixing tube 3. The injection nozzle 22 is provided with a flow channel 25 at the periphery thereof, which guides the compressed air within the outer cylinder 5 so as to be injected from an inlet 24 for injection. Air from the flow channel 25 serves to suppress spread of the conically injected fuel through the injection nozzle 22. This makes it possible to further alleviate and suppress adhesion of the fuel to the protruding wall 7 or the inner diameter enlarging portion 10.

Operations of the above-structured gas turbine combustor 1 according to the embodiment will be described.

The compressed air from the turbo-compressor is generally at the temperature of approximately 300° C. The compressed air is guided into the outer cylinder 5, flows inside through the holes 8 formed in the peripheral wall 6 of the premixing tube 3, and forms the swirl flow in the cylindrical gap S between the peripheral wall 6 and the inner wall 9. The swirl flow out of the gap S reaches the open end of the protruding wall 7 while flowing along the inner circumferential surface of the protruding wall 7, and further flows along the chamfer 11 of the inner diameter enlarging portion 10. Finally, it flows into the combustion cylinder while spreading outward.

Meanwhile, the compressed air is also supplied into the inner space of the inner wall 9 from the opening at the upper end of the premixing tube 3, and mixed with the fuel injected from the pressure injection unit 4 to form the mixture as the straight flow. It is fed into the combustion cylinder 2 from the protruding wall 7, and combusted to generate combustion gas at the temperature ranging from 1000 to 2000° C., for example. The aforementioned temperatures of the air and gas are taken as example values.

As for the flow of air in the embodiment, the swirl flow is guided and spread outward along the inner diameter enlarging portion 10. Therefore, the cross-section area of the air straight flow along the center of the premixing tube 3 corresponds to the one in the case where the swirl flow spreads to the outside. Assuming that each quantity of the fuel and air is kept constant, as the swirl flow is guided outward largely, and the cross-section area of the air straight flow becomes larger, the mixture flow velocity becomes relatively low. As a result, the lift distance of the flame becomes short. If the cross-section area of the air straight flow does not expand because the swirl flow is not largely guided outward, the mixture flow velocity becomes relatively high. As a result, the lift distance of the flame becomes long.

The compressed air and the fuel, or the mixture thereof in the inner wall 9 form the homogeneous straight flow along the axial direction of the inner wall 9 over the entire region inside thereof under no influence of the interference of the swirl flow of the compressed air formed in the gap S between the peripheral wall 6 and the inner wall 9. Since the cross-section area of the straight flow is adjusted in association with outward spread of the swirl flow by the inner diameter enlarging portion 10 as described above, combustion occurs at the lift distance in accordance with the flow velocity corresponding to the adjusted cross-section area of the flow.

The cross-section area of the mixture straight flow in the premixing tube 3 is reduced by the air swirl flow through the holes 8 formed in the peripheral wall 6 of the premixing tube 3. The flow is fed into the protruding wall 7 at the stabilized constant flow velocity without excessively accelerating, and subjected to the flow velocity adjustment in accordance with the shape of the inner diameter enlarging portion 10 from the time of passage therethrough to the time immediately thereafter. It generates the flame F at the predetermined lift distance L1 in the combustion cylinder 2 as shown in FIG. 3A. The flame is kept in the stabilized state as shown in FIG. 3B. The flame F is stably retained at the appropriate position in the combustion cylinder 2. This makes it possible to prevent deterioration in durability of the combustion cylinder 2 by the heat, and realize stabilization of combustion and low emission.

FIG. 3A represents the case where the chamfer 11 applied to the inner diameter enlarging portion 10 is of type C8. It is assumed that the lift distance L is required to be even longer in order to use the fuel that generates higher radiation heat upon combustion in the gas turbine combustor 1. For example, since the radiation heat generated by the aromatic fuel is greater than the radiation heat generated by kerosene or light oil upon combustion, the use of the aromatic fuel in the aforementioned structure may damage the combustion cylinder 2 and the like by heat even if the structure shown in FIG. 3A is suitable for the use of the kerosene or light oil. According to the embodiment, the inner diameter enlarging portion 10 is attached to the open end of the premixing tube 3 using a simple fixing member such as a bolt. This makes it possible to easily cope with the change of the fuel type by replacing the inner diameter enlarging portion 10 with the chamfer 11 having the different dimension. The shape and structure of the premixing tube 3 of the gas turbine combustor 1 do not have to be changed afterward, and the complicated and difficult work of minute change/adjustment with respect to quantity of the swirl air flow from the premixing tube 3 and the straight air flow is not necessary for the purpose of changing and adjusting the flame lift distance L.

It is assumed to use the inner diameter enlarging portion 10 with the chamfer 11 of type C3 as JIS (Japanese Industrial Standards) code, which is processed at 45° with dimensions of 3 mm in both horizontal and vertical directions as shown in FIG. 4A. The C3 denotes the type of the process that chamfers an isosceles triangle part with each of two equal sides set to 3 mm at the angle of 45° in the cross-section. The outward spread and guidance of the swirl flow is not as large as the case shown in FIG. 3A, and accordingly, the cross-section area of the straight flow of moving air along the center of the premixing tube 3 is narrower than the case shown in FIG. 3A. Assuming that each quantity of the fuel and air is kept constant, the respective flow velocities become relatively high. As a result, the lift distance L2 of the flame F is longer than the lift distance L1 shown in FIG. 3A. The flame may be stably retained at a farther position as indicated by FIG. 4B.

Figure 5A:
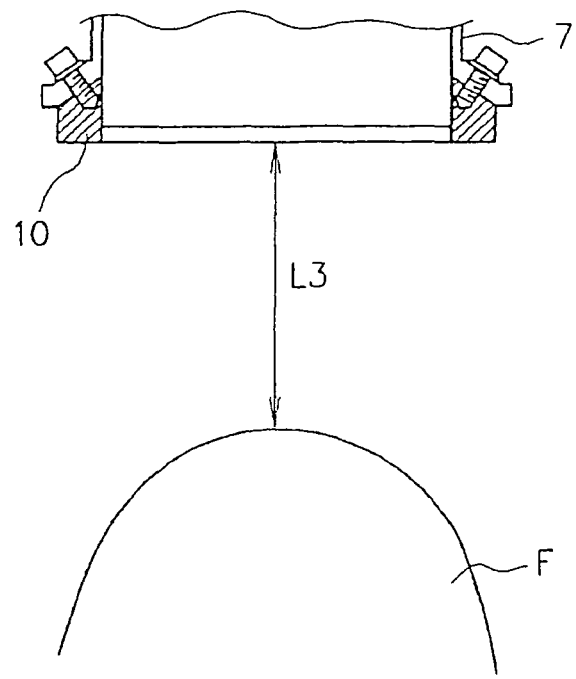
FIG. 5A is an enlarged longitudinal sectional view schematically showing a structure around the opening of the premixing tube according to the embodiment (type C0 chamfer of the inner diameter enlarging portion) and a lift distance L3 of the flame, which is relatively long upon combustion.
Figure 5B:
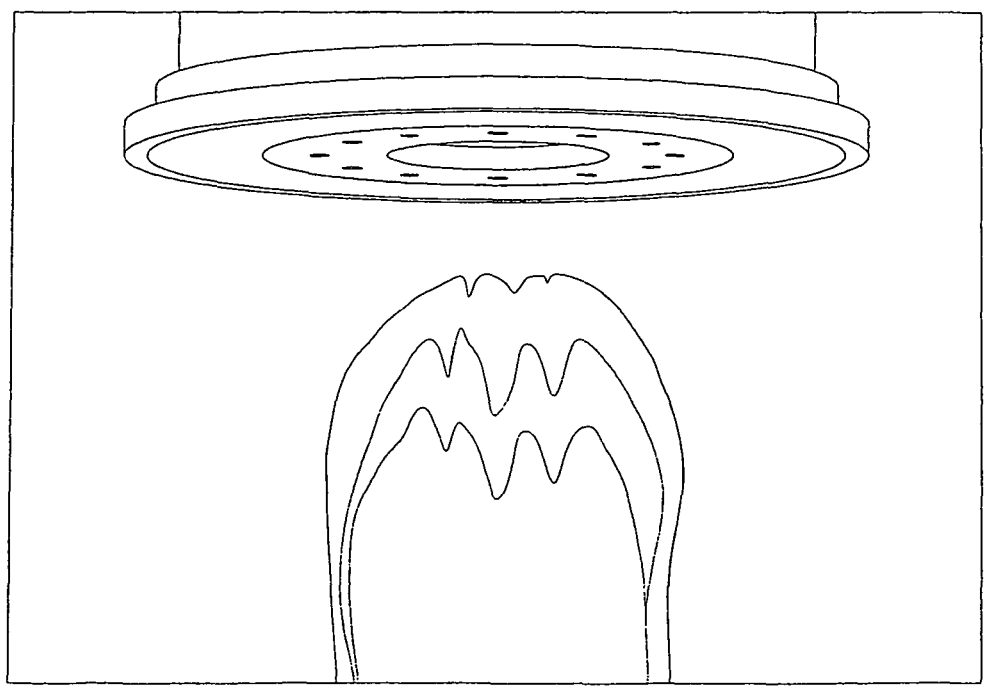
FIG. 5B is a photograph of the flame indicated in FIG. 5A.

It is assumed to use the inner diameter enlarging portion 10 with no chamfer 11, which has a right angle cross-section of type C0 as JIS code as shown in FIG. 5A. In this case, actually the chamfering is not performed. The inner diameter enlarging portion 10 does not serve to enlarge the inner diameter, that is, the inner diameter is the same as that of the protruding wall 7 of the premixing tube 3. The outward spread and guidance of the swirl flow in this case is not as large as in the case shown in FIG. 4A. The flow is fed into the combustion cylinder 2 while flowing downward along the inner circumferential surface of the protruding wall 7. The cross-section area of the straight flow of moving air along the center of the premixing tube 3 has no substantial change. Assuming that each quantity of the fuel and air is kept constant, the respective flow velocities do not largely change. That is, they become relatively higher than the case shown in FIG. 4A. As a result, the lift distance L3 of the flame F is longer than the lift distance L2 shown in FIG. 4A. The flame is stably retained at the farthest position as shown in FIG. 5B.

The adequacy of the lift distance of the flame F needs to be determined in accordance with radiation of heat generated by the flame F. If the lift distance is too short for the temperature of the flame F, the combustion cylinder 2 or the like may be damaged. If the lift distance is too long for the temperature of the flame F, the combustion becomes unstable, which may extinguish the flame F. The embodiment allows the inner diameter enlarging portion 10 with appropriate structure to be selectively attached in accordance with radiation of heat generated by the flame F so as to easily set the optimal lift distance L of the flame F. The angle, dimension and the like of the chamfer 11 of the inner diameter enlarging portion 10 may be arbitrarily set in accordance with the required lift distance of the flame and the overall structure of the device.

Results of actually measured flow velocities of air and fuel or combustion gas in the gas turbine combustor 1 according to the embodiment will be described.

Figure 6:
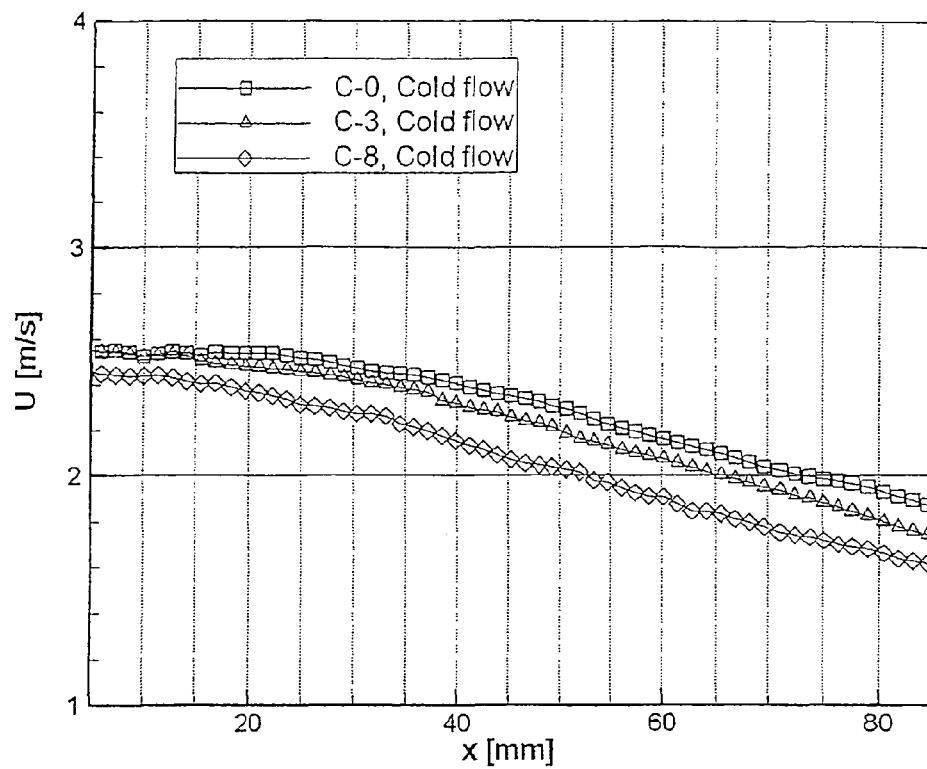
FIG. 6 is a graph representing flow velocity distributions of air and fuel gas before ignition along the center line of the premixing tube.

FIG. 6 represents data obtained from the gas turbine combustor according to the embodiment in the uncombusted state where air and the fuel gas flow without being ignited. FIG. 6 is a graph representing flow velocity distributions of the gas on the center line of the premixing tube 3 while setting the outlet of the premixing tube 3 to zero point (X=0) measured for each type of the inner diameter enlarging portion 10, that is, C8, C3, C0 as shown in FIGS. 3A to 5B. The unit of the distance X on x-axis is mm, and the unit of the axial flow velocity U on the y-axis is m/s. In the uncombusted state, there is not much difference among the flow velocities at the outlet of the premixing tube 3 (X=0). However, as the distance X becomes longer, the difference is markedly observed. The flow velocity derived from type C0 (FIGS. 5A and 5B) is the highest, the flow velocity derived from type C3 (FIGS. 4A and 4B) is the second, and the flow velocity derived from type C8 (FIGS. 3A and 3B) is the third.

The aforementioned results show that the inner diameter enlarging portion 10 that enlarges the inner diameter larger allows the swirl flow to spread outward largely, and accordingly, the cross-section area of the straight flow is expanded to reduce the flow velocity.

Figure 7:
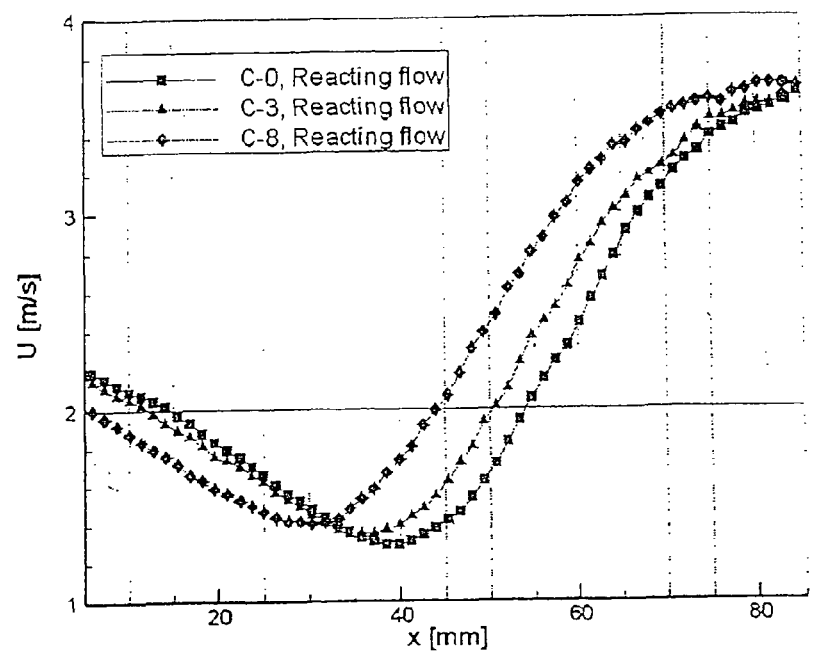
FIG. 7 is a graph representing flow velocity distributions of combustion gas along the center line of the premixing tube.

FIG. 7 represents data obtained from the gas turbine combustor 1 according to the embodiment in the combustion state by igniting supplied air and fuel gas. FIG. 7 is a graph representing flow velocity distributions of the combustion gas on the center line of the premixing tube 3 while setting the outlet of the premixing tube 3 to zero point (X=0) measured for each type of the inner diameter enlarging portion 10, that is, C8, C3, C0 as shown in FIGS. 3A to 5B. The units on the x-axis and the y-axis are the same as those shown in FIG. 6. In the combustion state, the flow velocity is not constant for the respective inner diameter enlarging portions 10. It is decreased as the distance X becomes longer from the outlet (X=0) of the premixing tube 3, and it starts increasing at a certain position until the predetermined value at a certain position. The position X at which the flow velocity starts increasing, that is, the X value corresponding to the minimum value of the respective data represents the lift distance L which is different in accordance with the structure of the inner diameter enlarging portion 10 as described above. According to the data in the graph of FIG.

7, the distance L=31 derived from type C8 (FIGS. 3A and 3B) is the shortest, the distance L=35 derived from type C3 (FIGS. 4A and 4B) is the second, and the distance L=39 (FIGS. 5A and 5B) is the third. The respective flow velocities become lower in the order of the types C8, C3 and C0 at the point before the minimum value due to the structures of the respective inner diameter enlarging portions 10, and the lift distances L where the flame is generated become shorter in the order of C8, C3 and C0. From the position subsequent to generation of the flame, the respective flow velocities of the combustion gas are increasing to a set value.

From the results, the inner diameter enlarging portion 10 with larger enlargement of the inner diameter makes the lift distance of the flame shorter, indicating the fact that the flame is approaching the lower end of the premixing tube 3 (or the top portion of the combustion cylinder 2).

An example of a structure of an inner diameter enlarging portion 30 for a gas turbine combustor according to a second embodiment will be described referring to FIGS. 8A to 8C.

Figure 8A:
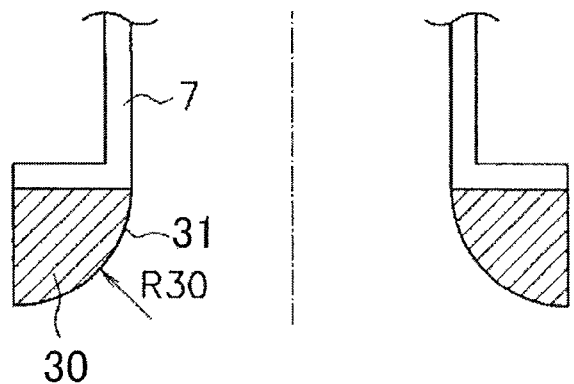
FIG. 8A is an enlarged longitudinal sectional view of a structure around an opening of a premixing tube according to a second embodiment when the inner diameter enlarging portion has a type R30 curved surface processing.
Figure 8B:
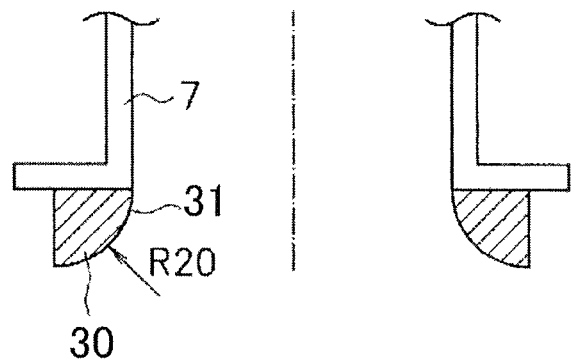
FIG. 8B is an enlarged longitudinal sectional view of a structure around the opening of the premixing tube according to the second embodiment when the inner diameter enlarging portion has a type R20 curved surface processing.
Figure 8C:
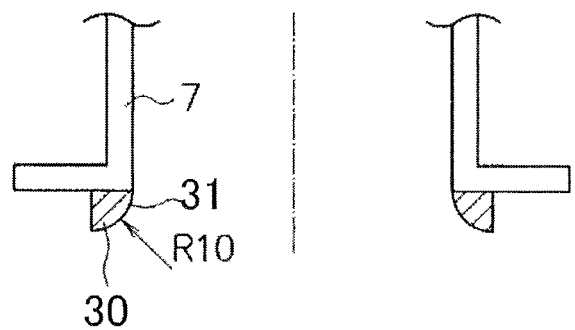
FIG. 8C is an enlarged longitudinal sectional view of a structure around the opening of the premixing tube according to the second embodiment when the inner diameter enlarging portion has a type R10 curved surface processing.

FIGS. 8A to 8C show a circumferential surface portion 31 with a fan-shape cross section, having a predetermined radius at the center angle of 90° as a curved portion on an inner circumferential edge of the inner diameter enlarging portion 30. FIG. 8A represents the circumferential surface portion with a radius of 30 mm, FIG. 8B represents the circumferential surface portion with a radius of 20 mm, and FIG. 8C represents the circumferential surface portion with a radius of 10 mm, respectively. Each of the respective portions is attached to the open end of the protruding wall 7 of the premixing tube 3 so as to be continued with the inner circumferential surface of the protruding wall 7, and to serve as the inner diameter enlarging portion 30 to expand the inner diameter toward the combustion cylinder 2 in the downward direction. It may be attached using an arbitrary method. As described in the first embodiment, it may be detachably fixed using the bolt. This embodiment provides the same effects as those described in the first embodiment. This embodiment employs the circumferential surface portion 31 with a fan-like cross-section of a predetermined radius as the curved portion. However, such portion may be formed to have a curved surface that expands the inner diameter toward the combustion cylinder 2 in the downward dimension.

What is claimed is:

1. A gas turbine combustor comprising:
    a combustion cylinder that combusts a mixture of fuel and air for supply of a combustion gas to a turbine;
    a premixing tube which is open to the combustion cylinder, and mixes the fuel and air so as to be supplied to the combustion cylinder;
    an inner diameter enlarging member separately formed from the premixing tube, and detachably attached to an open end of the premixing tube for replacement, the open end being open to the combustion cylinder;
    a fixing member for fixing the inner diameter enlarging member to the premixing tube such that the inner diameter enlarging member is detachably attached to the open end of the premixing tube for replacement; and
    a fuel supply unit attached to the premixing tube for supplying the fuel to the premixing tube.

2. The gas turbine combustor according to claim 1, wherein the inner diameter enlarging portion includes a planer processed portion at a predetermined angle.

3. The gas turbine combustor according to claim 1, wherein the inner diameter enlarging portion includes a curved portion.

4. A gas turbine combustor comprising:
    a combustion cylinder that combusts a mixture of fuel and air for supply of a combustion gas to a turbine;
    a premixing tube which is open to the combustion cylinder, and mixes the fuel and air so as to be supplied to the combustion cylinder;
    an inner diameter enlarging portion detachably provided at an open end of the premixing tube for replacement, the open end being open to the combustion cylinder; and
    a fuel supply unit attached to the premixing tube for supplying the fuel to the premixing tube,
    wherein the premixing tube comprises
    a peripheral wall having a straight cylindrical outer shape, and an inner shape with an inner diameter gradually reducing toward the combustion cylinder in a downward direction, and
    a protruding wall connected to a lower end of the peripheral wall, and having a straight cylindrical shape with an inner diameter same as an inner diameter of an opening of the peripheral wall at the lower end of the peripheral wall.

5. The gas turbine combustor according to claim 4, wherein the peripheral wall has a plurality of holes along a tangential direction, allowing the air to flow inside of the peripheral wall.

6. The gas turbine combustor according to claim 4, further comprising a cylindrical inner wall arranged coaxially with the peripheral wall and an inner side of the peripheral wall with a cylindrical gap between the peripheral wall and the cylindrical inner wall,
    wherein an outer circumferential surface of the cylindrical inner wall has an outer diameter gradually reducing toward the combustion cylinder in the downward direction, so that the cylindrical gap between the peripheral wall and the cylindrical inner wall is constant.

7. The gas turbine combustor according to claim 6, wherein the cylindrical gap has an upper end at one end side of the premixing tube closed, and a lower end opened around an upper end of the protruding wall.

8. The gas turbine combustor according to claim 1, wherein the premixing tube has a straight cylindrical shape reaching the open end, and an inner surface of the premixing tube and an inner surface of the inner diameter enlarging member are continuous.

9. The gas turbine combustor according to claim 1, wherein the premixing tube has a straight cylindrical shape portion inserted into the combustion cylinder, the straight cylindrical shape portion having the open end; and
    the inner diameter enlarging member includes an inclined surface portion having an inclination angle variable based on radiation heat of the fuel, and the inner diameter enlarging member is continuously connected to an inner surface of the premixing tube at the open end.

* * * * *